United States Patent Office 2,702,257
Patented Feb. 15, 1955

2,702,257

APPLICATION OF ANTISTATIC MATERIALS TO DIELECTRICS

Carlyle Harmon, Longmeadow, Mass., assignor, by mesne assignments, to Chicopee Manufacturing Corporation, Chicopee Falls, Mass., a corporation of Massachusetts No Drawing. Original application December 22, 1950, Serial No. 202,245, now Patent No. 2,676,115, dated April 20, 1954. Divided and this application December 24, 1953, Serial No. 400,380

4 Claims. (Cl. 117—138.8)

This invention relates to processes of applying antistatic materials to dielectric materials to render the latter astatic and products resulting from these processes and is a division of my copending application, Serial No. 202,425, now Patent No. 2,676,115. It is especially useful in the manufacture of fabrics for covering car seats and other upholstery and so will be described, for illustration only, in connection with such fabrics.

Automobile seats and other upholstery are commonly covered with fabrics woven from Saran, polyethylene and other polymers to obtain coverings having the many desirable properties of such materials. As used herein Saran means the copolymer of vinylidene chloride with vinyl chloride or acrylonitrile. All of these polymers are dielectric and, in common with other dielectric materials, they have the property of generating electrostatic charges when rubbed with wool, silk, cotton, fur and other materials. This makes the seats develop electrical charges in normal use due to rubbing against clothing, and these electrical charges frequently produce uncomfortable shocks and even dangerous sparks. Consequently, it has been the practice to attempt to render the upholstery covering astatic by treating it with antistatic material. As used herein astatic means absence of the property or ability of generating, inducing, or accumulating electrostatic charges. That is, an antistatic agent tends to produce an astatic result.

In a common antistatic treatment saran or polyethylene, for example, is dipped in a dilute dispersion of an antistatic agent in a volatile carrier and dried. Suitable antistatic agents include a large number of substances which I call etymols. Etymols include those aliphatic poly-hydroxy alcohols having from two to six carbon atoms and from two to six hydroxyl groups, examples being glyceryl esters such as glyceryl monostearate, mono-oleate, etc. Etymols also include monomeric cyclic ethers of the poly-hydroxy alcohols referred to; such ethers including long chain fatty acid partial esters of the hexitans (that is esters of monomeric cyclic ethers of hexitol) and hydroxy-polyalkylene ethers thereof, such as sorbitan monolaurate and sorbitan monolaurate poly-oxy-ethylene ether. Etymols also include polymeric ethers having at least two hydroxyl groups and which may be considered condensation products of the poly-hydroxy alcohols mentioned above, examples being polyethylene glycol esters, such as polyethylene glycol monostearate, mono-oleate, etc. and the polyethylene oxide ether of propylene-glycol monostearate.

While treatment of dielectrics such as polyethylene and saran with the etymols renders these dielectrics satisfactorily astatic the astatic results of the treatment are erratic and the astatic property is not as durable as is desired. Furthermore, a relatively great quantity of etymol must be left as residue on the surface of the dielectric to give satisfactory astatic results.

My invention is based on my discovery that plastic dielectric materials such as saran, if scraped immediately before applying the antistatic material, and particularly if scraped during application of the antistatic material, achieve a greatly improved astatic property, of increased durability and that this is accomplished by a startling reduction in the amount of antistatic material formerly required. I do not fully understand the reason for this, but I have discovered that these plastic dielectric materials usually have on their smooth surfaces minute and imperceptible films of plasticizing materials used in the formulation and manufacture of the polymer, and that these plasticizers, for some reason not fully understood, prevent the attainment of a uniform durable astatic property when treated with the etymols.

In accordance with my invention I scrape the surface of the polymer immediately before applying the antistatic material and I prefer to scrape the surface repeatedly during the application of the antistatic. I believe that this scraping breaks or removes the film of plasticizer and permits the antistatic material, particularly in the case of etymols, to adhere to the clean surface of the polymer or to combine with it—not necessarily combining in the chemical sense. I have found that this repeated scraping and simultaneous rubbing on of the antistatic not only achieves a given measure of astatic property with a startlingly great reduction in quantity of antistatic material over what was formerly required, but also that a greater uniformity and reliability of result is obtained and that the resulting astatic property is of far greater durability than can be obtained by previously known methods. This is particularly the case with fabrics woven from saran monofilaments.

Various methods and means of scraping the surface of the dielectric polymer can be used to practice my invention but I prefer to use the square-cut ends of nylon monofilaments of about 0.014 inch diameter. Preferably a large number of scraping elements are used simultaneously side by side. One way of doing this is to mount filaments about two inches long radially in a rotary core, and to have the filaments as close together as is practical. When the core is rotated and the saran passed over the surface determined by the ends of the nylon filaments, myriads of individual scrapers scratch, disrupt, and collectively remove the film of exuded plasticizer. If a stream of an antistatic dispersion is played over the surface being scraped, or if the surface while being scraped is submerged in a bath of antistatic dispersion, the dispersion will be applied simultaneously with the scraping, and the nylon filaments will also positively rub the dispersion onto the freshly scraped surface.

The nylon filaments form resilient scrapers which are particularly effective in scraping the film of plasticizer and rubbing on the antistatic agent into the interstices of woven cloth.

In order to measure the astatic protection afforded by my invention, the needle deflection of a very sensitive electroscope was calibrated in numerical values approximately proportional to the voltage induced on the electroscope. A deflection of 5 units represents the highest induced voltage that I have found permissible on saran fabric used for upholstering an automobile seat. That is, a piece of saran cloth charged to a voltage of 5 as shown by this electroscope will discharge so as to produce a noticeable shock to a person coming in contact with it. A deflection of greater than 5 indicates that a shock will be uncomfortable and objectable. A deflection of less than 5 will not produce noticeable or objectionable shock.

As an example of my invention, I treated a closely woven fabric of saran monofilaments having a diameter of 10 to 12 mils with a polyethylene oxide ether of propylene glycol monostearate, for example, that manufactured under the trade name G2150 by Atlas Powder Company. A 7% dispersion in water of this etylmol was applied to the fabric and the fabric surface was immediately subjected to two simultaneous actions: (1) a scraping to disrupt the film of plasticizer and (2) a rubbing action to distribute the etymol coating. This scraping and rubbing was done effectively by a myriad of closely-spaced, resilient nylon monofilaments having square-cut scraping and rubbing ends of a diameter of about 0.014 inch. After drying, the fabric was rubbed vigorously with a woolen cloth and then brought near the sensitive electroscope. A static charge of ½ unit was shown on the treated cloth by the electroscope. A residue of "G–2150" weighing about 0.1% of the weight of the saran was deposited on the treated fabric. A seat cover of this material was applied to the seat of an otherwise conventional automobile which was operated with two passengers under conditions known to develop objectionable static in untreated seats. The seat developed no objectionable static charges in operation.

For purposes of comparison two pieces of saran fabric similar to that used in the above example were treated with a water dispersion of "G-2150." The "G-2150" was applied to both pieces of fabric by dipping then into the dispersion and then drying them in air. No scraping or rubbing operation was given either piece of fabric in applying the antistatic agent. On the first piece of fabric that was treated by this method I used a 3% concentration of "G-2150" in a water dispersion. After drying, the treated fabric was rubbed briskly with a woolen cloth and brought near the sensitive electroscope. A static charge of ½ unit was shown on the treated cloth by the electroscope unit. A residue of "G-2150" weighing about 1% of the weight of the saran was deposited on the treated fabric. In other words, this latter method requires ten times the quantity of "G-2150" in order to render the saran astatic to the same degree as that afforded the saran by applying the same agent according to the method of this invention.

The second piece of material treated for comparative control data was dipped in ⅓% water dispersion of "G-2150." After drying, the treated fabric was rubbed briskly with a woolen cloth and brought near the sensitive electroscope. The electroscope showed that there was a static charge equivalent to 10 units on the treated fabric. A residue of "G-2150" weighing about 0.1% of the weight of the saran was deposited on the treated fabric. These results showed that for an equal quantity of antistatic agent left on the fabrics saran induced or accumulated a charge of static electricity when rubbed with a woolen cloth which was ten times greater than that induced or accumulated on the saran treated according to the present invention.

It will be understood that my invention is not limited to the illustrations of the foregoing explanation, but includes what is defined within the scope of the appended claims.

The invention claimed is:

1. An astatic woven fabric consisting of plasticized filaments comprising the copolymer of vinylidene chloride with vinyl chloride or acrylonitrile, said filaments being coated with a uniform film of antistatic agent and being substantially free from film of exuded plasticizer.

2. An astatic woven fabric consisting of filaments of plasticized dielectric polymers, said filaments being coated with a uniform film of antistatic agent and being substantially free from film of exuded plasticizer.

3. An astatic woven fabric according to claim 2, wherein the film of antistatic agent weighs less than about 1 per cent of said filaments.

4. An astatic woven fabric according to claim 3, wherein said polymer is the copolymer of vinylidene chloride with vinyl chloride or acrylonitrile and said antistatic agent is selected from the group consisting of aliphatic poly-hydroxy alcohols having from two to six carbon atoms and from two to six hydroxyl groups and ethers and esters of said poly-hydroxy alcohols.

References Cited in the file of this patent

UNITED STATES PATENTS 2,676,115   Harmon _____ Apr. 20, 1954